(12) United States Patent
Promuto

(10) Patent No.: US 6,412,428 B1
(45) Date of Patent: Jul. 2, 2002

(54) METHOD AND APPARATUS FOR DRYING AND INCINERATION OF SEWAGE SLUDGE

(76) Inventor: Vincent Promuto, 2800 Yacht Club Blvd., Ft. Lauderdale, FL (US) 33304

(*) Notice: Subject to any disclaimer, the term of this patent is extended or adjusted under 35 U.S.C. 154(b) by 0 days.

(21) Appl. No.: 09/745,009

(22) Filed: Dec. 20, 2000

(51) Int. Cl.$^7$ .............................. F26B 11/12; F23G 5/04
(52) U.S. Cl. ....................... 110/224; 110/128; 110/238; 110/110; 34/166; 34/168; 34/134; 34/182
(58) Field of Search ..................... 34/424, 165, 166, 34/168, 134, 135, 102, 103, 114, 122, 128, 130, 595, 137; 110/218, 224, 226, 228, 101 R, 110, 238, 225, 227, 204

(56) References Cited

U.S. PATENT DOCUMENTS

| | | | | |
|---|---|---|---|---|
| 237,080 A | * | 1/1881 | Mercer | 34/166 |
| 562,845 A | * | 6/1896 | McGiehan | 110/226 |
| 1,117,720 A | * | 11/1914 | Stone | 34/166 |
| 2,021,012 A | * | 11/1935 | McCullough | 34/166 |
| 2,038,904 A | * | 4/1936 | Rand | 34/7 |
| 3,027,854 A | * | 4/1962 | Akerlund | 110/15 |
| 3,559,596 A | * | 2/1971 | Ishii | 110/7 |
| 3,871,285 A | * | 3/1975 | Bastgen | 110/8 R |
| 3,909,958 A | * | 10/1975 | Castonoli | 34/166 |
| 3,954,069 A | * | 5/1976 | Loken | 110/8 R |
| 3,976,018 A | * | 8/1976 | Boulet | 110/10 |
| 4,030,895 A | * | 6/1977 | Caughey | 48/111 |
| 4,213,407 A | * | 7/1980 | Headley | 110/346 |
| 4,245,570 A | * | 1/1981 | Williams | 110/238 |
| 4,361,100 A | * | 11/1982 | Hinger | 110/238 |
| 4,483,257 A | * | 11/1984 | den Otter | 110/218 |
| 4,504,222 A | * | 3/1985 | Christian | 432/139 |
| 4,759,300 A | * | 7/1988 | Hansen et al. | 110/229 |
| 5,301,619 A | * | 4/1994 | Keersmaeker | 110/246 |
| 5,325,795 A | * | 7/1994 | Nelson et al. | 110/236 |
| 5,337,684 A | * | 8/1994 | Summers | 110/346 |
| 5,411,714 A | * | 5/1995 | Wu et al. | 422/232 |
| 5,561,917 A | * | 10/1996 | Ratajczek | 34/384 |
| 5,566,469 A | * | 11/1996 | Bolton et al. | 34/135 |
| 5,628,126 A | * | 5/1997 | North | 34/599 |
| 5,630,366 A | * | 5/1997 | Lesoille | 110/221 |
| 5,904,105 A | * | 5/1999 | Pappinen | 110/226 |
| 5,946,815 A | * | 9/1999 | Wetzel | 34/136 |
| 6,098,553 A | * | 8/2000 | Oksanen et al. | 110/224 |
| 6,110,430 A | * | 8/2000 | Swisher et al. | 422/173 |
| 6,164,220 A | * | 12/2000 | Magnusson | 110/246 |
| 6,226,889 B1 | * | 5/2001 | Aulbaugh et al. | 34/424 |
| 6,367,163 B1 | * | 4/2002 | Luker | 34/182 |

* cited by examiner

*Primary Examiner*—Ira S. Lazarus
*Assistant Examiner*—K. B. Rinehart
(74) *Attorney, Agent, or Firm*—Mintz, Levin, Cohn, Ferris Glovsky & Popeo, PC; Brett N. Dorny, Esq.

(57) ABSTRACT

A system for drying sludge includes a shaftless spiral feed screw for moving sludge through a drying chamber. An high energy inductor is located at a output of the drying chamber for drawing hot gases through the chamber to dry the sludge as it advances from the input end to the output end of the chamber. The high energy inductor also aspirates the dried sludge from the chamber. The drying system can be used in conjunction with a waste-to-energy furnace for incineration of sludge and municipal waste. In such an arrangement, the dried sludge can be aspirated from the drying chamber directly into a combustion zone of the furnace. Hot gases from the furnace can be used in drying the sludge.

7 Claims, 5 Drawing Sheets

METHOD AND APPARATUS FOR DRYING AND INCINERATION OF SEWAGE SLUDGE

BACKGROUND OF THE INVENTION

1. Field of the Invention

The present invention relates to a method and apparatus for disposal of sewage sludge. In particular, it relates to a method and apparatus for drying and combustion of sludge in connection with refuse incineration.

2. Discussion of the Related Art

Various methods have been developed over the years to dispose of sewage sludge, the discharge from waste water purification. Such methods include landfilling, composting, wet spreading and drying for fertilizer. However, these methods are proving to be controversial and unacceptable in today's environment. Also, landfills have become increasingly expensive as landfills are closed and transportation costs have increased to new locations. Landspreading is not sufficiently sanitary, resulting in leaching of some sludge byproducts into fresh water supply systems. Although sewage sludge is rich in nutrients, its heavy metals, pathogens and other chemical contents have raised questions about its acceptability for spreading on farmland, in either the wet or dry forms. Also, the drying of sewage sludge for fertilizer requires significant energy, which has become more expensive.

More recently, incineration has developed as a way to dispose of sewage sludge and to reduce reliance on other fuel sources. Since sewage sludge has a high water content, as much as 95%, dewatering and drying processes are required prior to incineration. Typically, dewatering is carried out with filter presses, belt filter presses or centrifuges. Drying uses cylindrical rotary kilns, kilns with overlying beds, fluidized bed furnaces, grinding driers or indirect driers of different constructions. A representative apparatus for incineration of sewage sludge is disclosed in U.S. Pat. No 3,954,069. Another such apparatus is disclosed in U.S. Pat. No. 4,311,103. The steps of dewatering and drying require significant energy and transport of the sewage sludge, with different water contents, to various locations for these processes to occur. These systems also require a complicated infrastructure with multiple pieces of interconnected processing equipment.

In order to address disposal of both sewage sludge and household or municipal solid waste, different waste combustion systems have been developed. Initial systems attempted to mix the sewage sludge and municipal solid waste together prior to being fed to the waste to energy boiler. However, in such a system, the overall water content of the sludge and waste results in poor combustion and slower feed rates. To overcome this problem, one system, disclosed in U.S. Pat. No. 4,753,181, fed the sewage sludge separately from the municipal waste. In this system, the sewage sludge is dispersed in small droplets over the flame in front of the combustion zone. The droplets are dried and incinerated by the hot air in the furnace. However, since the sludge is still in a liquid state, the flow rate must be controlled to keep the moisture content in the furnace within acceptable levels.

U.S. Pat. No. 5,410,973 discloses a system which uses the flue gases from refuse combustion and sewage sludge incineration in processing the other type of waste. The sewage sludge is incinerated in a rotary tubular kiln. Flue gases from the refuse furnace are drawn in the opposite direction of sludge flow for drying and incinerating the sludge in a single process stage. The flue gases from the kiln are fed back into the refuse furnace for afterburning. This system, however, requires two distinct furnaces, one for sludge and one for refuse. The materials cannot be combined. Additionally, when the flue gasses are transferred between the furnaces, they must be kept hot enough so as not to adversely affect the incineration process.

U.S. Pat. No. 5,630,366 discloses another system in which the sewage sludge is dried before it passes to the incinerator. The sludge is dehydrated by centrifuging-drying using the heat of the fumes from the refuse furnace. The dried sludge is then combined with the municipal waste to be incinerated. This system makes use of the hot gases from the furnace in drying the sludge, but requires transportation of sludge in various forms to different locations. Furthermore, the gases must be directed to the drying chamber for the sludge.

Therefore, a need exists for a simple system for processing sewage sludge for incineration. A need exists for a system which can incinerate sewage sludge in conjunction with municipal waste. A need exists for a system which can dry sewage sludge before combustion without significant energy uses and without requiring transport to multiple processing areas.

SUMMARY OF THE INVENTION

The present invention overcomes deficiencies of prior art systems by providing a single processing stage for transporting and drying the sewage sludge, the dried sludge can be directly injected into a typical municipal waste to energy plant incorporating the invention. The present invention includes a drying system having a spiral feed screw without a central shaft. Heated air, which could be from a furnace, is directed through the center of the drying system for drying the sewage sludge. A high energy inductor at the end of the feed system provides the draw for the heated air. The high energy inductor also expels aspirated, dried sludge. When incorporated into a waste to energy plant, the drying system can feed the dried sludge directly into the combustion zone of the furnace, resulting in combustion of the sludge. The municipal waste to energy plant can be operated in an ordinary manner without the need for additional energy or processing.

DETAILED DESCRIPTION OF PREFERRED EMBODIMENTS

Figure 1:
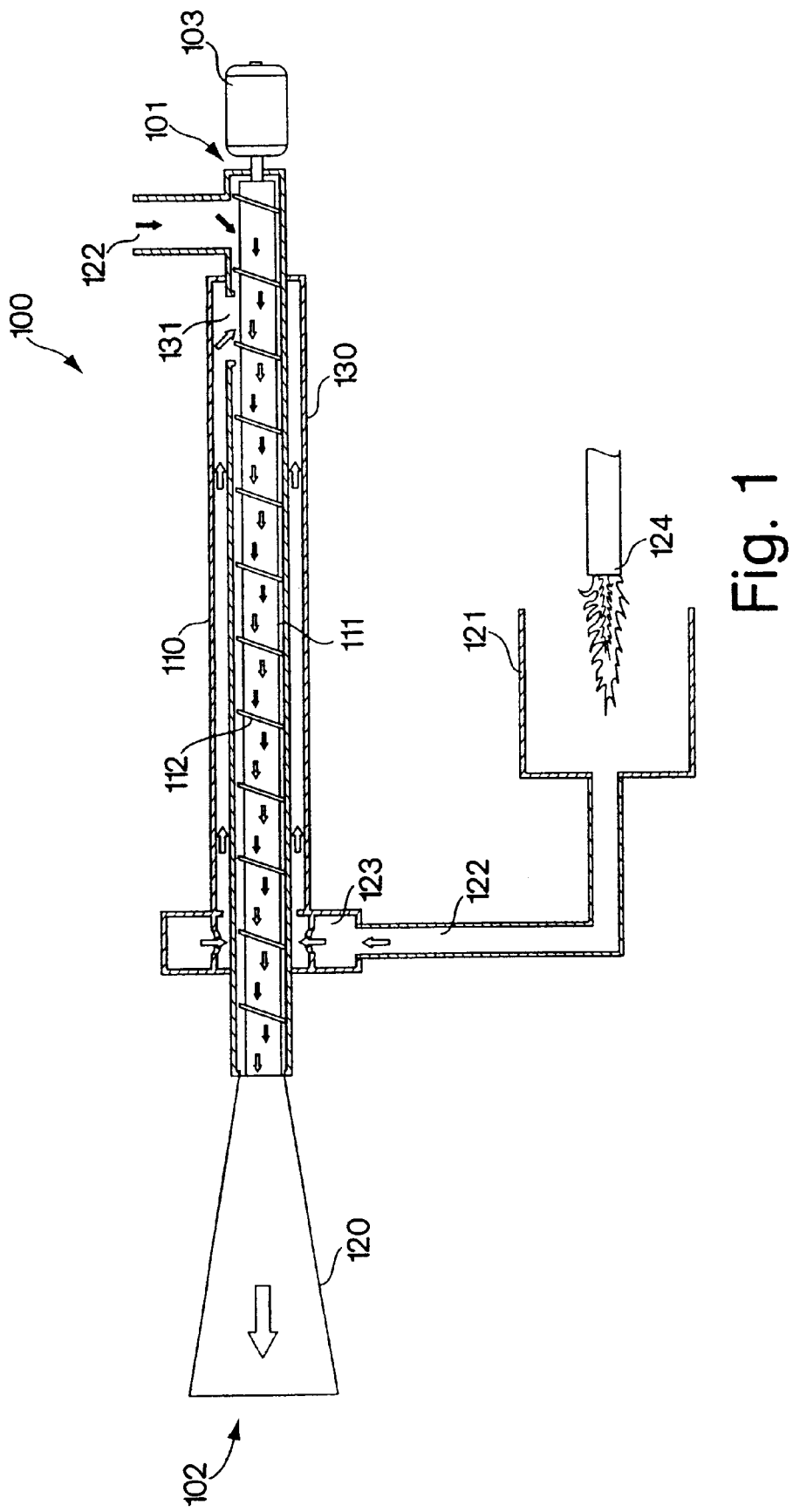
FIG. 1 is a cross sectional view of a sewage sludge drying system according to an embodiment of the present invention.

The drying system of the present invention is illustrated in FIG. 1. The drying system 100 receives sewage sludge at one end 101 and discharges dried sludge at the opposite end 102. The drying system 100 includes a screw feeder 110 having a housing 111 and a shaftless screw 112 in the housing 111. The housing 111 and shaftless screw 112 can be of various materials, including carbon steel, stainless steel or other hybrid alloys. The material used will depend upon the temperatures and other operating conditions of the drying system. The shaftless screw 112 can be of any type, but a suitable shaftless screw is manufactured by Spirac of Sweden. Alternatively, a ribbon type screw conveyor could be used rather than a shaftless screw. Of course, a shafted or multiple screw conveyor could also be used as long as air can flow through the conveyor. The shaftless screw is rotated by a drive motor 103 which can be externally located at the feed end of the screw feeder 110.

At the discharge end 102 of the feed system is a high capacity blower 120 with a venturi flow passage. The venturi flow passage causes the high capacity blower to move substantial amounts of flue gas with a small air feed source. The high capacity blower 120 or inductor may vary in size and material depending upon the conditions of the sludge and the operating temperatures. According to an embodiment of the present invention, as illustrated in FIG. 1, the gas feed source is provided by a hot air supply 121 piped 122 to the entrance of the high capacity blower 120. Fans, blowers or other devices (as shown) can be used to force the hot gas into the high energy inductor for the gas feed source. Compressed air or steam may be used as a feed source for the high capacity blower 120. An alternative thermal 124 heat source can be used to heat the air for the hot air supply. The additional air moved by the high capacity blower also comes from the hot air. As illustrated in FIG. 1, the hot gas can be drawn through ducts 130 along the screw feeder 110. The hot gas enters through an inlet 131 at the feed end 101. In this manner, the housing 111 of the screw feeder 110 is heated and the sludge is heated through the surface and through heated gas passing through the feed system.

The shaftless screw 112 is driven using an external motor 103 to move the sludge toward the high capacity blower 120. As the sludge is moved through the feed system 100, the hot furnace gas passing through the system dries the sludge. The moisture content of the sludge at the discharge end 102 can be controlled by the speed of rotation of the shaftless screw 112 relative to the gas being moved through the feed system 100 and in relation to the rate at which sludge is added to the feed system. The sludge input rate can be controlled using variable speed drives or a pneumatic control valve system. When the sewage sludge reaches the discharge end of the feed system, it is sufficiently dry, to be aspirated through the high capacity blower. The high volumes of gas passing through the drying system causes aspiration and distribution of the sludge at the discharge end 102.

Figure 2:
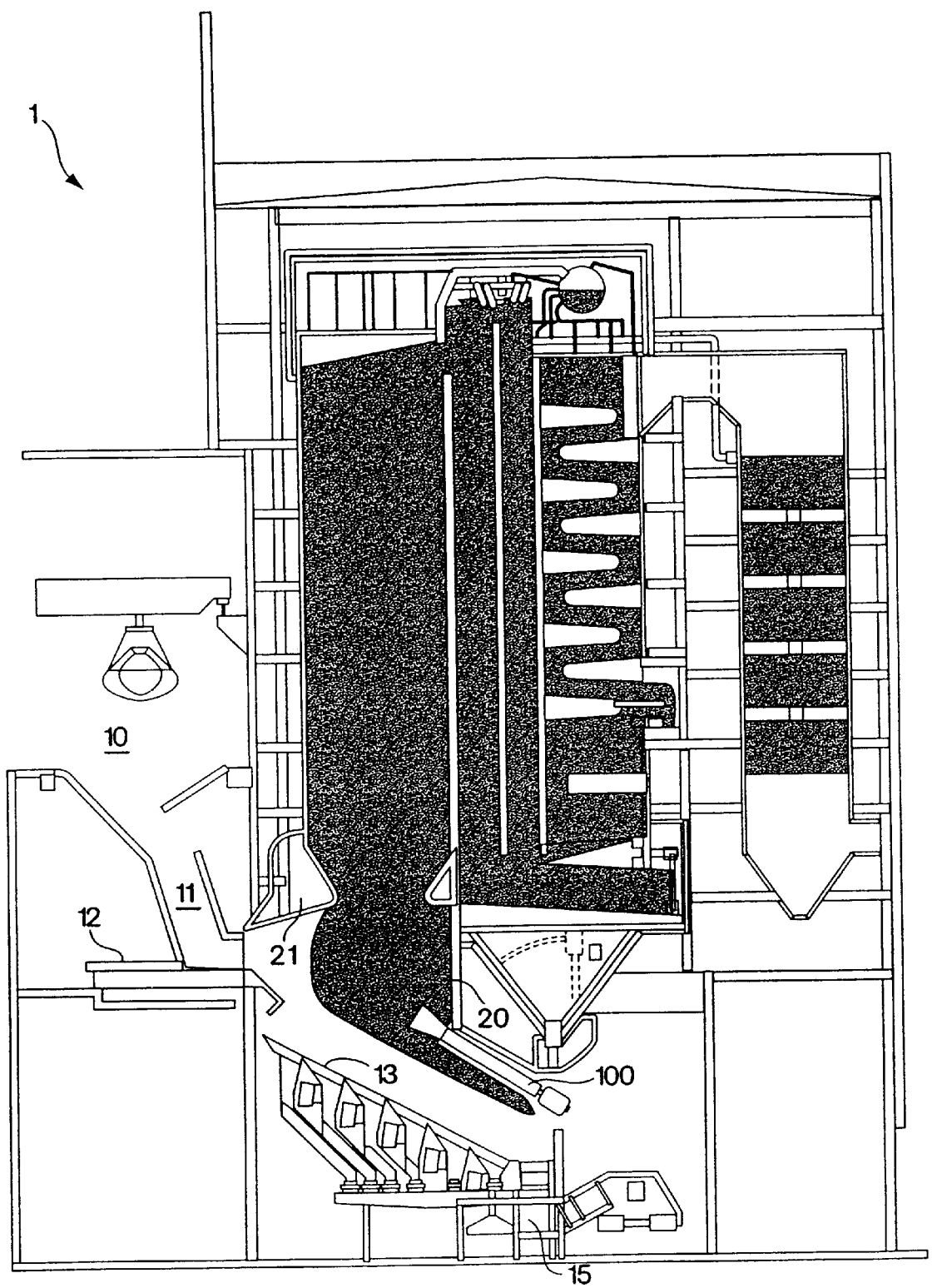
FIG. 2 is a cross sectional view of a typical municipal waste to energy boiler incorporating an embodiment of the present invention.
Figure 3:
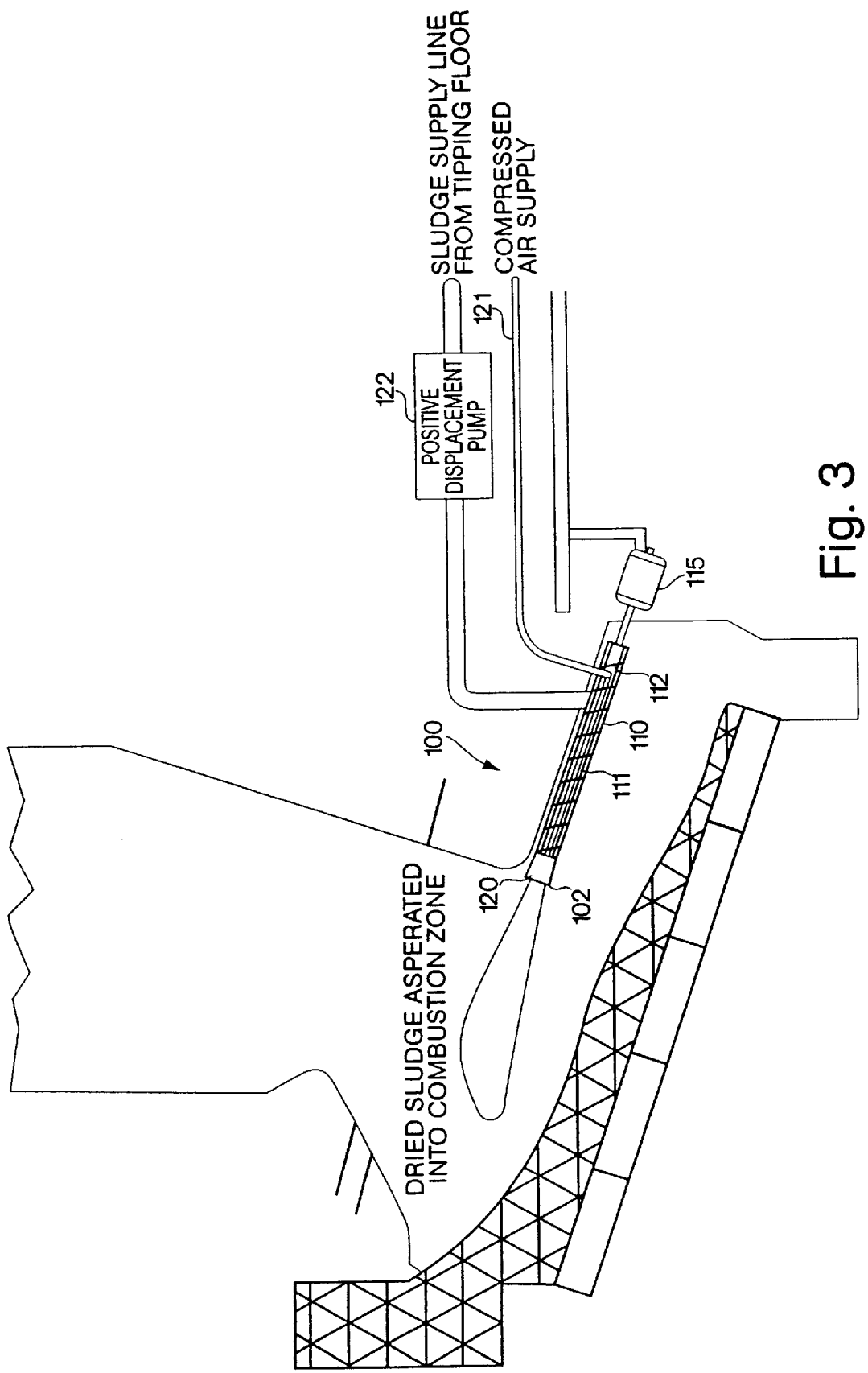
FIG. 3 is a partial cross sectional view of a typical municipal waste to energy boiler incorporating an embodiment of the present invention.

FIG. 2 illustrates a typical municipal waste to energy boiler 1, which incorporates the present invention. The refuse is passed from a feed hopper 10, down a chute 11 to the furnace. A ram feeder 12 pushes the refuse onto a grate 1 of the furnace. The refuse passes along the grate 13 where it is combusted. Air for combustion 14 is fed from below the grate. Above the grate is an overfire combustion section 20. This section includes air inlets 21, 22 and auxiliary burners (not shown). In accordance with typical designs, the exhaust gases are used to produce steam and are processed to reduce emissions with state of the art air pollution control equipment. Ash passes through the grate and is collected at the lower end of the furnace 15.

An embodiment of the present invention includes a feed system 100 disposed within the furnace. The drying system is positioned on the furnace so as to utilize the hot gases from the furnace for drying and to allow incineration of the dried sludge. In the embodiment of FIG. 2, the drying system 100 is located within the furnace 1. The heat source 121 of the drying system can be eliminated in favor of hot gases from the furnace. The hot air ducts 130 can remain open at the discharge end 102 of the drying system to draw on hot gases for the drying process. A source of compressed air or steam is used as a feed source for the high capacity blower 120.

Figure 4:
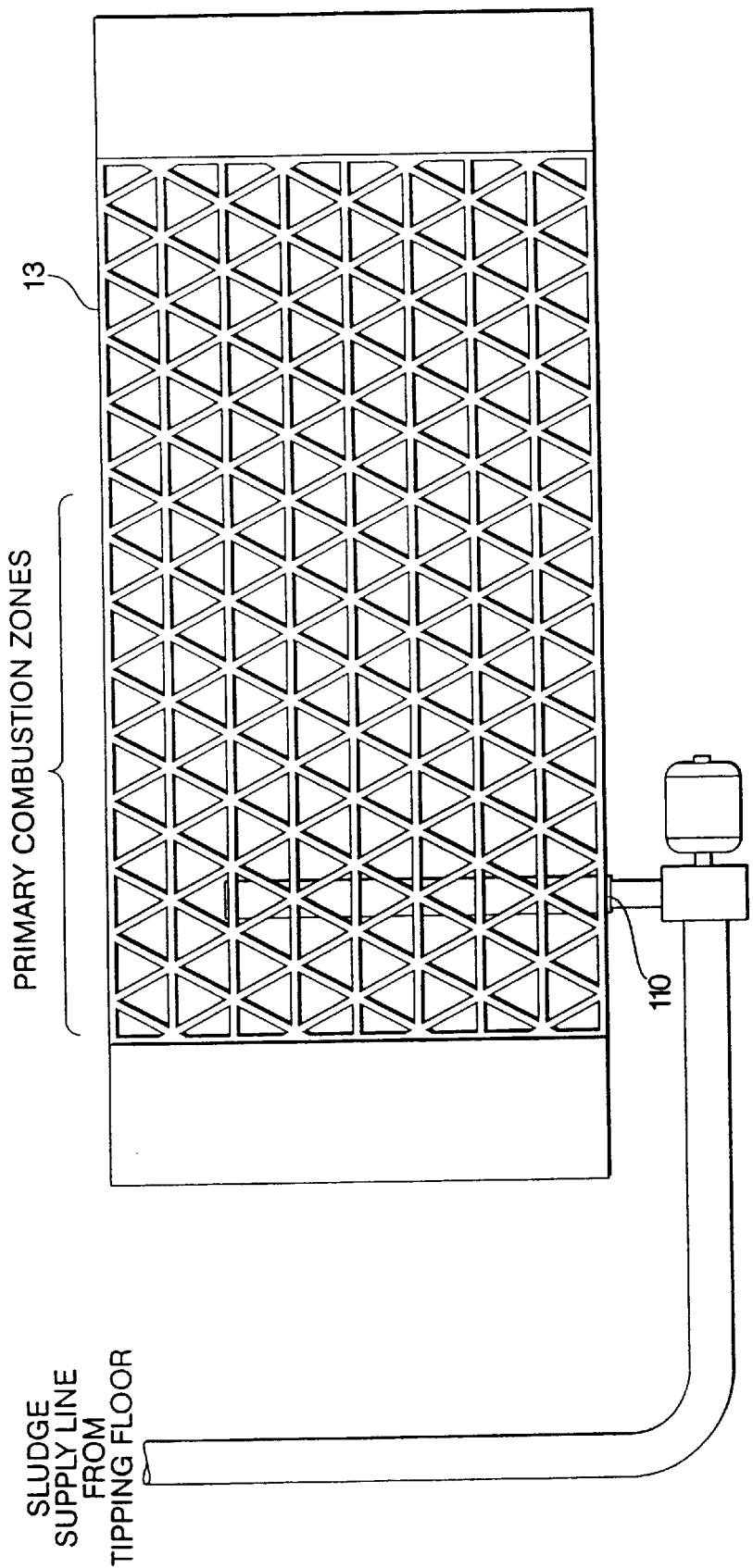
FIG. 4 is a top view of the feed system shown in FIG. 3 along the line IV—IV.

During operation, sewage sludge, having up to 95% water content, is pumped 122 from the tipping floor or other supply source to the feed end of the feeding system 100. Although a positive displacement pump 122 is illustrated in FIG. 2, other types of conveyors may be used to move the sludge to the feeding system. Such conveyors could include phenumatic dense phase, hydraulic sludge pump, or drag, belt or screw conveyors. Due to the placement of the drying system in the furnace, the aspirated sludge is discharged into the combustion zone of the furnace, preferably below the OFA zone, zone 20. In addition, multiple inductors or other types (different sizes) of inductors, in combination with or replacement for the high capacity blower 120, can be used. Such inductors could include different types of fans. FIG. 4 illustrates the placement of the feed system 100 relative to the grate 13 of the furnace. Of course, the drying system could be located anywhere such that the aspirated sludge is feed into the furnace for combustion. Furthermore, the present invention could be used with different types of furnaces or boilers, such as solid fuel boilers with traveling or reciprocating grates, hydrogrates, and air or steam swept grates. The present invention could also be used on different fluid bed units.

Figure 5:
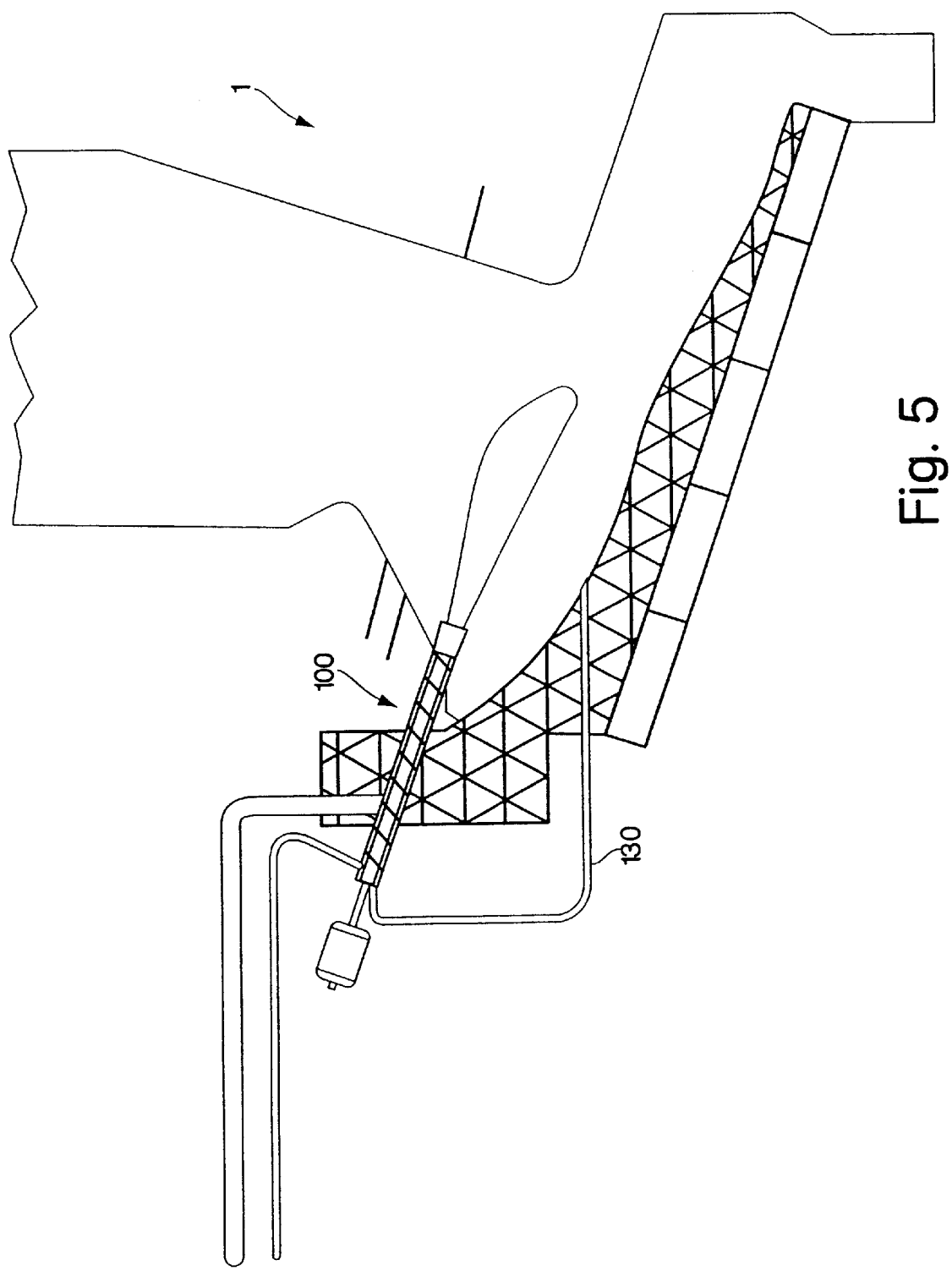
FIG. 5 is a partial cross sectional view of a typical municipal waste to energy boiler incorporating a second embodiment of the present invention.

FIG. 5 illustrates a second embodiment of the present invention. In the second embodiment, the feed system 100 is located externally from the furnace 1. Ducts 130 can be used to draw heated air from the furnace for drying the sludge. The dried sludge is still discharged into a combustion zone of the furnace.

Of course, other designs could be used for creating the drying system. And the drying systems could be used with different types of waste. For example, rather than municipal sewage sludge, the drying system of the present invention could be used with paper mill products such as pulp and paper sludges, wood chips, saw dust, and bark. The present invention may also be used to dry and incinerate animal wastes, including hog, horse, cow and poultry manure. The present invention may also be used for drying wastes without incineration. The drying system could be directed into a storage or transportation bin so that the dried material is aspirated into the bin for transport or other use.

Furthermore, those of ordinary skill in the art will recognize that adaptations and modifications can be made to the embodiments without departing from the essential characteristics of the present invention. The scope of the invention is not limited by the embodiments disclosed and includes adaptations and modifications.

I claim:

1. A system for drying sludge, comprising:
   a housing formed as a tube having an input end and an output end;
   a transport system within said housing for moving sludge from said input end to said output end;
   a supply of hot gases connected to an interior of said housing at said input end of said housing; and
   an air movement system connected to the interior of said housing at said output end of said housing, the air movement system exhausting gases from the interior of said housing to draw hot gases from said supply of hot gases through said housing such that the hot gases moving through the interior of the housing contact and dry said sludge, and said air movement system further discharging said sludge from said output end with the exhausting gases.

2. The system for drying sludge according to claim 1, wherein said transport system includes:
   a screw mechanism disposed in said housing; and
   a motor located externally from said housing for rotating said screw mechanism.

3. The system for drying sludge according to claim 1, wherein said air movement system includes:
   a high capacity blower attached to said output end of said housing; and
   an air feed source connected between said output end of said housing and an input end of said high capacity blower, the air feed source providing an air flow to said high capacity blower to drive said high capacity blower.

4. The system for drying sludge according to claim 1, wherein said supply of hot gases includes:
   a heat source for heating air; and
   ducts for providing air heated by said heat source to said input end of said housing.

5. The system for drying sludge according to claim 1, further comprising at least one duct located on an external surface of said housing for providing hot gases from a source of hot gases located away from said input end of said housing to said supply of hot gases at said input end of said housing; said at least one duct being positioned such that hot gases passing through said duct heat a surface of said housing.

6. The system for drying sludge according to claim 1, wherein said system for drying sludge is positioned at a waste-to-energy furnace such that dried sludge is discharged from said output end into said waste-to-energy furnace, and wherein said supply of hot gases is supplied from said waste-to-energy furnace.

7. The system for drying sludge according to claim 6, further comprising:
   at least one duct located on an external surface of said housing having an opening in said furnace for collecting hot gases and for providing hot gases along said housing to said supply of hot gases at said input end of said housing; said at least one duct being positioned such that hot gases passing through said duct heat a surface of said housing.

\* \* \* \* \*